United States Patent [19]

Alshawi

[11] Patent Number: 5,815,196
[45] Date of Patent: Sep. 29, 1998

[54] VIDEOPHONE WITH CONTINUOUS SPEECH-TO-SUBTITLES TRANSLATION

[75] Inventor: Hiyan Alshawi, Millburn, N.J.

[73] Assignee: Lucent Technologies Inc., Murray Hill, N.J.

[21] Appl. No.: 581,666

[22] Filed: Dec. 29, 1995

[51] Int. Cl.[6] .................................................. H04N 7/14
[52] U.S. Cl. ................................. 348/17; 348/14; 704/2; 704/277; 379/52
[58] Field of Search ...................... 348/14–17; 379/93.01, 379/93.14, 93.15, 93.26, 52, 53, 54, 201; 704/8, 270, 271, 277, 2

[56] References Cited

U.S. PATENT DOCUMENTS

| | | | |
|---|---|---|---|
| 5,369,704 | 11/1994 | Bennett et al. | 348/15 |
| 5,512,938 | 4/1996 | Ohno | 348/15 |

*Primary Examiner*—Curtis A. Kuntz
*Assistant Examiner*—Stephen Wolff Palan

[57] ABSTRACT

There is disclosed a method and apparatus for providing continuous speech-to-subtitles translation utilizing a video-based communications device but without speech synthesis at the output. Instead, a translation of each user's speech is displayed continuously in text form on the other user's screen. In the preferred embodiment, the sending party speaks into a conventional videophone. Speech recognition and translation of the transmitted signal are performed by a remote device at the receiving party's location. The audio portion of the signal is sent both to a speaker for audio output and to a speech recognizer and text-based translation system, the output of which is text translated into the target language. The video portion of the signal and the translated text are combined in a subtitle generator and sent to a display device for viewing by the receiving party.

9 Claims, 2 Drawing Sheets

VIDEOPHONE WITH CONTINUOUS SPEECH-TO-SUBTITLES TRANSLATION

TECHNICAL FIELD

This invention relates to a method and apparatus for providing continuous speech-to-subtitles translation for communication between people speaking different languages.

BACKGROUND OF THE INVENTION

As the world moves closer and closer to a true global economy, the need for individuals who speak different languages to be able to easily communicate has increased. Efforts have been made to facilitate communication between people speaking different languages using current speech-to-speech translation technology wherein the translated speech is synthesized in the target language.

Current speech-to-speech translation technology operates such that language is translated and synthesized sentence by sentence or phrase by phrase. Typically in such systems, a user speaks an entire sentence or phrase and presses a button or flips a switch when completed. The device then translates the entire sentence or phrase and synthesizes and outputs the translation in the target language. Thus, the other party must wait for the speech synthesizer to stop before responding. Such systems are currently preferred because they include in the synthesized translation the intonations, often related to emotion, contained in the original speech. Such intonations are generally thought to increase the quality of the communication. The result, however, is a delay between one party speaking and the other party hearing the synthesized translation which can make communication awkward and unnatural. A system which instead translates and synthesizes one word at a time would most likely also sound awkward and unnatural and would lack the normal intonations of speech. Thus, although research and development efforts are aimed at eliminating the current limitations of speech-to-speech translation technology, it is unlikely that any resulting systems will be capable of perfect simultaneous translation and speech synthesis for many years.

SUMMARY OF THE INVENTION

The problems and limitations associated with speech-to-speech translation are avoided, in accordance with the principles of the present invention, by using a video-based communication device for speech translation, but without speech synthesis of the output. Instead, a translation of each user's speech is displayed continuously in text form on the other user's screen. At the same time, the original, untranslated speech is played over a speaker.

In the preferred embodiment, the sending party speaks into a conventional prior art videophone. The output of the videophone, a signal consisting of both the audio and video portions of the communication, is transmitted to the receiving party's location. Speech recognition and translation of the transmitted signal are performed by a remote device at the receiving party's location. The audio portion of the signal is sent both to a speaker for audio output and to a speech recognizer and text-based machine translation system, the output of which is translated text. The video portion of the signal and the translated text are then combined in a subtitle generator and sent to a display device for viewing by the receiving party.

Because users hear the actual voice of the other party, the communication is more personal and is likely to be perceived to be of higher quality. Hearing the original speech can also reduce misunderstanding because emotional clues are available to the listener. Also, in the event that an imperfect translation takes place, users can look over the stream of translated words and make use of their knowledge of the other language to try to reconstruct the intended meaning. Moreover, because the original untranslated speech is provided audibly and the translated text is provided visually, users can employ any knowledge they may have of the original language. Finally, according to the preferred embodiment, the sending party need not be aware that the other party has translation subtitles displayed on their screen, a feature that would be appreciated by users embarrassed about their foreign language skills.

DETAILED DESCRIPTION

Figure 1:
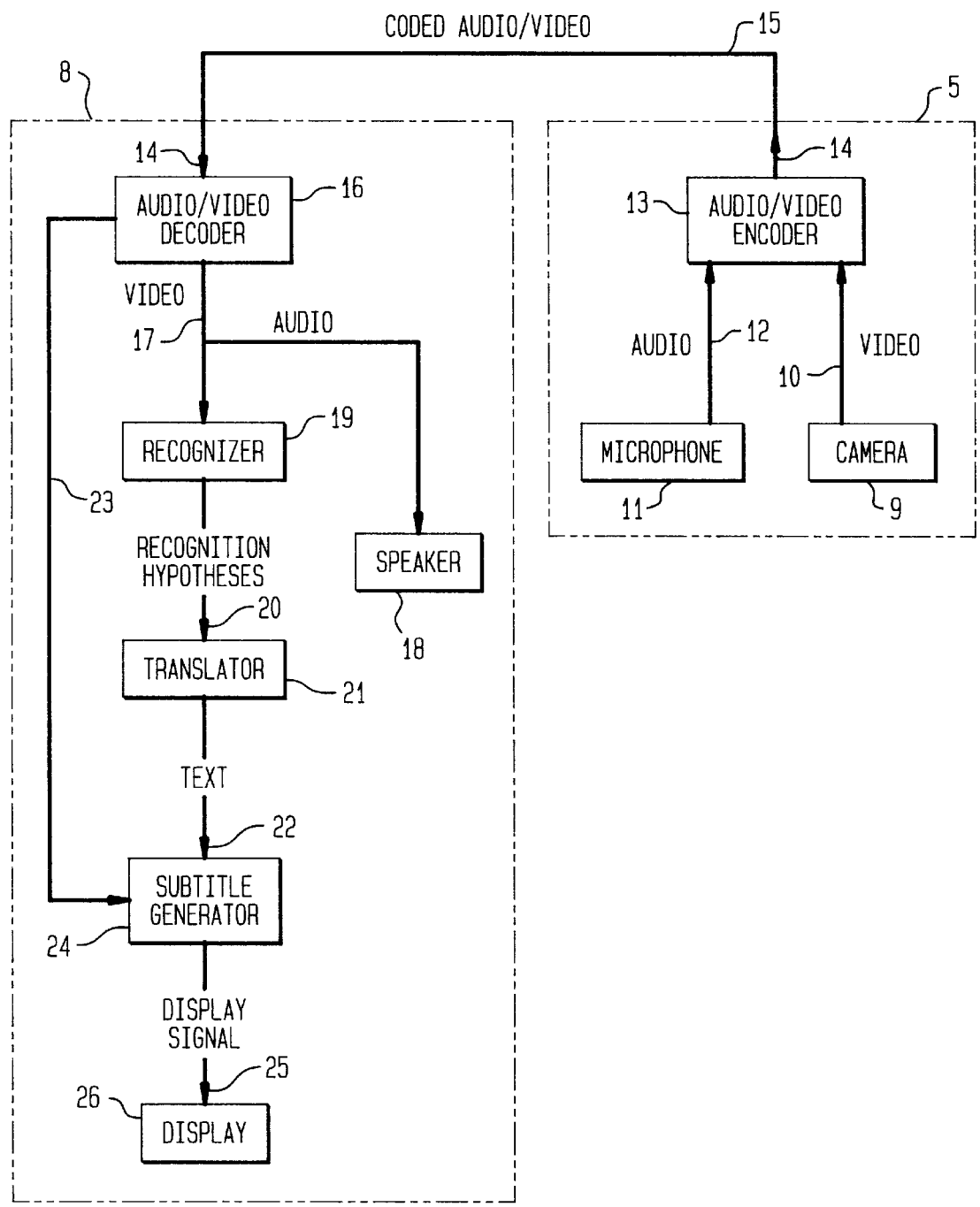
FIG. 1 is a block diagram of an embodiment of the present invention wherein recognition, translation and subtitle generation are performed remotely.

Referring to FIG. 1, a diagram of the presently preferred embodiment of the system is shown. Conventional prior art videophone 5, such as the AT&T VT2500, is located at the sending party's location. Remote receiving device 8 is located at the receiving party's location. The sending party speaks into videophone 5 which contains camera 9 and microphone 11. Camera 9 outputs video signal 10, which represents the visual component of the communication, and microphone 11 outputs audio signal 12, which represents the speech component of the communication. Video signal 10 and audio signal 12 are fed into audio/video encoder 13. Audio/video encoder 13 is a conventional digital signal processing device which can be found in the transmitting end of the AT&T VT2500. Audio/Video encoder 13 converts video signal 10 and audio signal 12 into a single encoded digital signal 14. Encoded digital signal 14 is placed on conventional telephone line 15 for transmission to remote receiving device 8.

At remote receiving device 8, encoded digital signal 14 is fed into audio/video decoder 16. Similar to audio/video encoder 13, audio/video decoder 16 is a conventional digital signal processing device which can be found in the receiving end of the AT&T VT2500. Audio/video decoder 16 converts encoded digital signal 14 back into two separate signals, video signal 23 and audio signal 17. Audio signal 17, which is in the original language of the sending party, is simultaneously fed into speaker 18 for audio output to the receiving party and into recognizer 19. Recognizer 19 is a conventional speech recognizer which converts human speech to text. Speech recognizers are well known in the art and are described, for example, in L. R. Rabiner and B. H. Juang, *Fundamentals of Speech Recognition*, Prentice-Hall (1993). Using a prior art statistical pattern recognition technique, recognizer 19 converts audio signal 17 into recognition hypothesis 20, which consists of one or more possible sequences of words in text format corresponding to audio signal 17. Essentially, recognition hypothesis 20 is a signal representing the most likely textual counterpart to the spoken language represented by audio signal 17. Recognition hypothesis 20, however, is still in the original language of the sending party, and thus needs to be translated into the target language.

Recognition hypothesis 20 is sent to translator 21. Translator 21 is a conventional text-based machine translation system which converts text in one natural language to text in another natural language. Text-based machine translation systems are well known in the art and are described, for example, in W. J. Hutchins and H. L. Somers, *An Introduction to Machine Translation*, Academic Press (1992). Translator 21 takes recognition hypothesis 20 and translates it into the target language. If recognition hypothesis 20 consists of a set of possible sequences of words, translator 21 applies a language model which chooses the most likely grammatical version for translation. The output of translator 21 is text signal 22.

Text signal 22 and video signal 23 are sent to subtitle generator 24 where the two signals are overlaid onto one another to create display signal 25. In display signal 25, text signal 22 appears as subtitles to video signal 23. Subtitle generator 24 is common in the prior art, especially in the film industry.

Subtitle generator 24 outputs display signal 25 which in turn is sent to video display device 26, such as a monitor, for display to the receiving party. Thus, the receiving party can simultaneously hear the original speech of the sending party and view the video of the sending party overlaid with subtitles translating the sending party's speech.

Because the recognition and translation functions are performed at remote receiving device 8, standard existing videophone transmission signals and protocols, such as ITU-H.261 and IT-TH.263, can be used. As such, the only party that needs to have any special equipment is the receiving party. The sending party need only use a standard videophone and need not know that the translation and subtitling are taking place.

Figure 2:
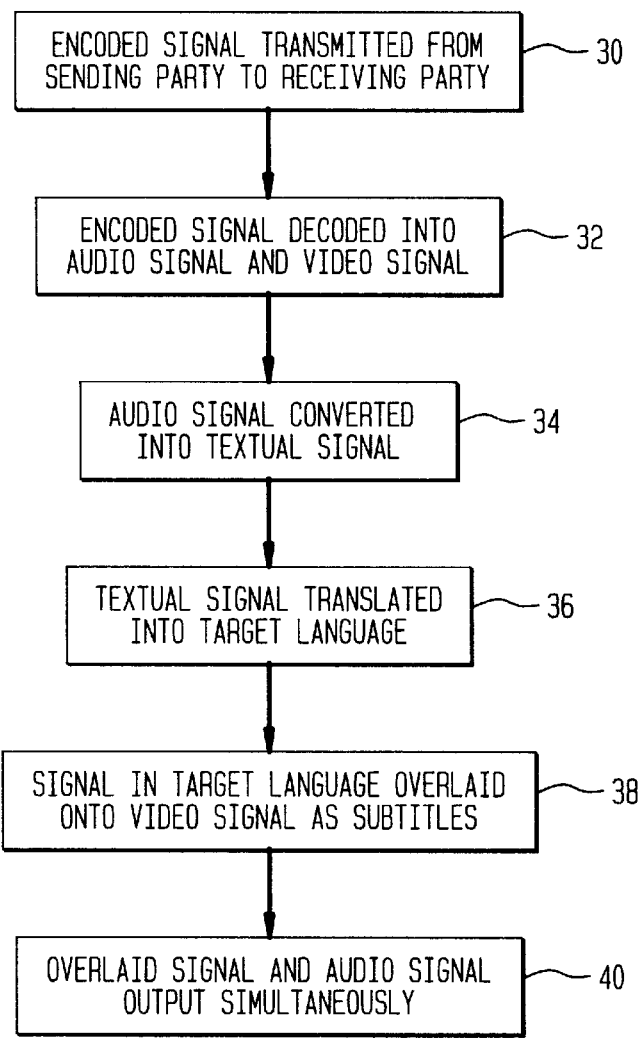
FIG. 2 is a flow diagram illustrating the method for providing continuous speech-to-subtitles translation.

Referring now to FIG. 2, a flow diagram illustrating the method for providing continuous speech-to-subtitles translation is shown. Block 30 shows that after a sending party speaks into his or her videophone, the encoded signal output thereby is sent to the receiving party's location. As shown in Block 32, the encoded signal is then decoded into an audio signal and a video signal. Block 34 shows that the audio signal is then converted into a corresponding textual signal in the sending party's language. Block 36 shows that the textual signal is then translated into a textual signal in the receiving party's language, also known as the target language. As shown in block 38, the textual signal in the target language is then overlaid onto the video signal as subtitles. Finally, as shown in block 40, the video signal with subtitles overlaid thereon and the audio signal are simultaneously output to the receiving party.

Figure 3:
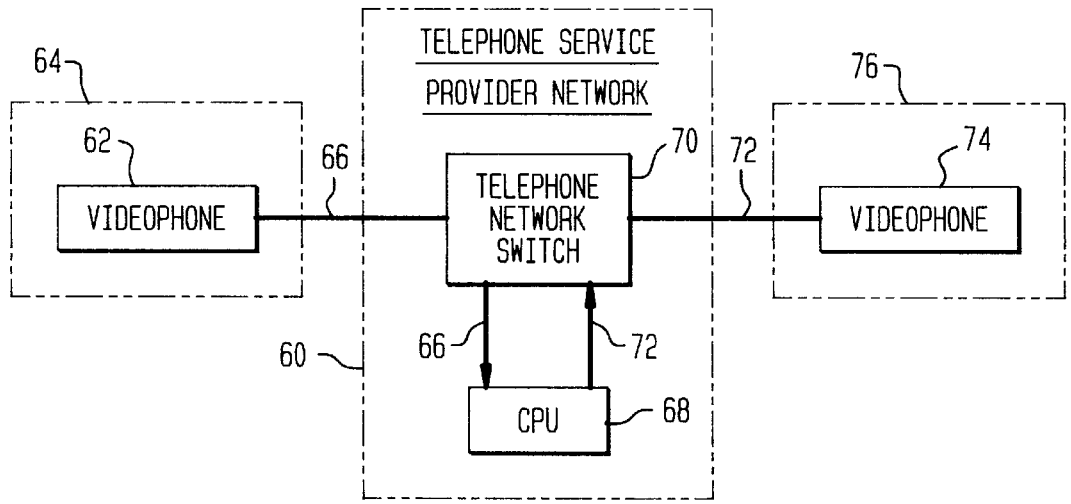
FIG. 3 is a block diagram of an embodiment of the present invention wherein recognition, translation and subtitle generation are performed by a telephone service provider network.

Referring now to FIG. 3, an alternate embodiment of the system is shown wherein the recognition, translation and subtitle generation functions are performed by telephone service provider network 60 rather than at the receiving party's location. Conventional videophone 62 located at the sending party's location 64 outputs signal 66. Signal 66 is a standard videophone signal. Signal 66 is sent to central processing unit, or CPU, 68 which is attached to telephone network switch 70. CPU 68 and telephone network switch 70 are part of telephone service provider network 60. CPU 68 contains algorithms which perform the recognition, translation and subtitle generation functions on signal 66. CPU 68 outputs signal 72. Signal 72 consists of an audio portion, which contains the sending party's original speech, and a subtitled video portion. Signal 72 is sent to conventional videophone 74 located at the receiving party's location 76 where it can be viewed by the receiving party.

In this embodiment, the continuous speech-to-subtitles translation would be provided as a service by the telephone service provider wherein the user is charged a fee for each use. As such, a person desiring speech-to-subtitle translation could access the service as needed, using a conventional videophone. This embodiment would also allow the use of standard videophone transmission signals and protocols. Finally, like the preferred embodiment, this embodiment would allow the receiving party to use the service without the knowledge of the sending party.

Still further alternate embodiments of the system are possible. One such embodiment would entail performing the recognition and translation functions at the sending party's locations. Another such embodiment would entail performing the recognition function at the sending party's location and the translation function at the receiving party's location. Both such alternate embodiments would require the transmission of data, i.e., the translated text in the case of the former and the recognition hypothesis in the case of the latter, in addition to the transmission of audio and video signals. Thus, these alternate embodiments would require the use of modified videophone equipment. These alternate embodiments, however, would have the advantage of providing more accurate recognition than in the preferred embodiment because the recognition function is performed locally rather than at the receiving party's location. Local recognition is more accurate because the audio signal does not have to be transmitted over telephone lines before recognition takes place. Conversely, in the preferred embodiment, when encoded digital signal 14 is sent to the receiving party's location, the quality of audio signal 17 is somewhat diminished due to the limited bandwidth of conventional telephone line 15.

It is to be understood that the above description comprises only a few of the possible embodiments of the present invention. Numerous other arrangements may be devised by one skilled in the art without departing from the spirit and scope of the invention. The invention is thus limited only as defined in the accompanying claims.

What is claimed is:

1. An apparatus for providing continuous speech-to-subtitle translation of a signal containing a video portion, and an audio portion comprising:

(a) means for converting said audio portion to a corresponding first textual signal, wherein said converting means is located at a sending party's location;

(b) means for translating said corresponding first textual signal to a second textual signal wherein said second textual signal is in a target language and wherein said translating means is located remotely from said sending party's location;

(c) means for combining said video portion with said second textual signal to form a display signal, wherein said display signal displays said second textual signal as subtitles; and (d) means for simultaneously displaying said display signal and outputting said audio portion.

2. An apparatus according to claim 1, wherein said converting means comprises a speech recognizer.

3. An apparatus according to claim 1, wherein said translating means comprises a text-based machine translation system.

4. An apparatus according to claim 1, wherein said combining means comprises a subtitle generator.

5. A method of providing continuous speech-to-subtitle translation of a signal containing a video portion and an audio portion, comprising the steps of:
 (e) converting said audio portion to a corresponding first textual signal at a sending party's location;
 (f) translating said corresponding first textual signal to a second textual signal at a location remote from said sending party's location, wherein said second textual signal is in a target language; and
 (g) combining said video portion with said second textual signal to form a display signal, wherein said display signal displays said second textual signal as subtitles.

6. A method according to claim 5, further comprising the step of displaying said display signal and outputting said audio portion simultaneously.

7. A method according to claim 5, wherein said converting step is performed by a speech recognizer.

8. A method according to claim 5, wherein said translating step is performed by a text-based machine translation system.

9. A method according to claim 5, wherein said combining step is performed by a subtitle generator.

* * * * *